United States Patent
Shi

(10) Patent No.: US 12,160,828 B2
(45) Date of Patent: Dec. 3, 2024

(54) DISCONTINUOUS RECEPTION PROCESSING METHOD, AND TERMINAL DEVICE

(71) Applicant: GUANGDONG OPPO MOBILE TELECOMMUNICATIONS CORP., LTD., Dongguan (CN)

(72) Inventor: Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 346 days.

(21) Appl. No.: 17/681,106

(22) Filed: Feb. 25, 2022

(65) Prior Publication Data
US 2022/0182940 A1 Jun. 9, 2022

Related U.S. Application Data

(63) Continuation of application No. PCT/CN2019/117669, filed on Nov. 12, 2019.

(51) Int. Cl.
*H04W 76/28* (2018.01)
*H04W 52/02* (2009.01)
(Continued)

(52) U.S. Cl.
CPC ..... *H04W 52/0232* (2013.01); *H04W 72/044* (2013.01); *H04W 72/23* (2023.01); *H04W 76/20* (2018.02)

(58) Field of Classification Search
CPC ........... H04W 52/0232; H04W 72/044; H04W 72/23; H04W 76/20; H04W 52/0216;
(Continued)

(56) References Cited

U.S. PATENT DOCUMENTS 11,184,944 B2 * 11/2021 Nam .................. H04W 76/28
11,297,569 B2 * 4/2022 Nam .................. H04W 72/23
(Continued)

FOREIGN PATENT DOCUMENTS

CN 109496454 A 3/2019
CN 109983822 A 7/2019
(Continued)

OTHER PUBLICATIONS

Extended European Search Report issued in corresponding European application No. 19952585.8, mailed Jul. 7, 2022.
(Continued)

*Primary Examiner* — Hanh N Nguyen
(74) *Attorney, Agent, or Firm* — BAYES PLLC

(57) ABSTRACT

Disclosed are a discontinuous reception (DRX) processing method, a terminal device, a chip, a computer readable storage medium, a computer program product, and a computer program. The method comprises: the terminal device performs data reception on a first downlink (DL) bandwidth part (BWP), wherein the first DL BWP is a BWP for which a monitoring occasion of a wakeup signal (WUS) is configured; if the terminal device switches from the first DL BWP to a second DL BWP for data reception within a monitoring time period of the WUS configured on the first DL BWP and before a DRX ON duration timer starts, the terminal device starts the DRX ON duration timer at a start time of the DRX ON duration timer to enter a DRX activation period, wherein the second DL BWP is a BWP for which a monitoring occasion of the WUS is not configured.

14 Claims, 4 Drawing Sheets

---

A terminal device performs data reception on a first downlink (DL) bandwidth part (BWP) — 21

If the terminal device switches from the first DL BWP to a second DL BWP for data reception within a monitoring time period of the WUS configured on the first DL BWP and before a discontinuous reception (DRX) ON duration timer starts, the terminal device starts the DRX ON duration timer at a start time of the DRX ON duration timer to enter a DRX activation period — 22

(51) Int. Cl.
*H04W 72/044* (2023.01)
*H04W 72/23* (2023.01)
*H04W 76/20* (2018.01)

(58) Field of Classification Search
CPC ............ H04W 52/0235; H04W 76/28; H04W 36/0083; H04W 72/0453; H04W 74/0833; H04W 76/27
See application file for complete search history.

(56) References Cited

U.S. PATENT DOCUMENTS

| | | | |
|---|---|---|---|
| 2019/0158229 | A1 | 5/2019 | Wei et al. |
| 2020/0029316 | A1* | 1/2020 | Zhou .............. H04W 74/0833 |
| 2021/0176762 | A1* | 6/2021 | Islam .................. H04B 7/0626 |
| 2022/0394619 | A1* | 12/2022 | Berggren ............. H04W 76/28 |

FOREIGN PATENT DOCUMENTS

| | | | |
|---|---|---|---|
| CN | 110337830 | A | 10/2019 |
| CN | 110383898 | A | 10/2019 |
| WO | 2019061080 | A1 | 4/2019 |
| WO | 2021064280 | A1 | 4/2021 |

OTHER PUBLICATIONS

Vivo, "Left issues and RRC parameters for PDCCH-WUS", R2-1914690, 3GPP TSG-RAN WG2 Meeting #108 Reno, USA, Nov. 18-22, 2019.
Vivo, "WUS impact upon BWP switching", R2-1912331, 3GPP TSG-RAN WG2 Meeting #107bis Chongqing, China, Oct. 14-18, 2019.
Qualcomm Incorporated, "PDCCH-based power saving channel design", R1-1912970, 3GPP TSG-RAN WG1 #99 Reno, USA, Nov. 18-22, 2019.
International Search Report issued in corresponding International Application No. PCT/CN2019/117669, mailed Jun. 30, 2020, 29 pages.
Written Opinion of the International Searching Authority issued in corresponding International Application No. PCT/CN2019/117669, mailed Jun. 30, 2020, 7 pages.
"Report from session on Legacy LTE, Rel-15 LTE, and NR NTN SI, NR power saving SI", Agenda: 13.1.5, Source: Session Chair (InterDigital), 3GPP TSG-RAN WG2 Meeting #106 R2-1911515, Reno, USA, May 13-17, 2019, 35 pages.
"Draft Report of 3GPP TSG RAN WG1 #98bis v0.1.0 (Chongqing, China, Oct. 14-20, 2019)", Source: MCC Support, 3GPP TSG RAN WG1 Meeting #99 R1-191xxxx, Reno, USA, Nov. 18-22, 2019, 148 pages.
"Remaining issues of PDCCH-WUS", Agenda Item: 6.11.2, Source: CATT, 3GPP TSG-RAN WG2 Meeting #108 R2-1914524, Reno, USA, Nov. 18-22, 2019, 3 pages.
First Office Action issued in corresponding European application No. 19952585.8, mailed Mar. 23, 2023.
First Office Action issued in corresponding Chinese application No. 202210480782.8, mailed Jun. 14, 2023.

* cited by examiner

DISCONTINUOUS RECEPTION PROCESSING METHOD, AND TERMINAL DEVICE

CROSS-REFERENCE TO RELATED APPLICATION

This application is a continuation of International Application No. PCT/CN2019/117669, entitled "DISCONTINUOUS RECEPTION PROCESSING METHOD, AND TERMINAL DEVICE", filed Nov. 12, 2019, the contents of which are incorporated herein by reference in its entirety.

TECHNICAL FIELD

The present disclosure relates to the field of information processing technology, and in particular, to a discontinuous reception processing method, a terminal equipment, a chip, a computer-readable storage medium, a computer program product, and a computer program.

BACKGROUND

In 5G New Radio (NR), the network device may configure a Discontinuous Reception (DRX) function for the terminal device, so that the terminal can discontinuously monitor the Physical Downlink Control CHannel (PDCCH). On this basis, the design of a Wake-up signal (WUS) is further introduced, and according to the WUS, it can be determined whether to start the DRX ON duration timer. However, with the introduction of the BandWidth Part (BWP) operation, how to control the DRX ON duration timer when BWP switching occurs has become a problem that needs to be solved.

SUMMARY

To solve the foregoing technical problem, the embodiments of the present disclosure provide a discontinuous reception processing method, a terminal device, a chip, a computer-readable storage medium, a computer program product, and a computer program.

In a first aspect, there is provided a discontinuous reception processing method, and the method includes:
receiving, by a terminal device, data on a first downlink (DL) bandwidth part (BWP); where the first DL BWP is a BWP configured with a monitoring occasion of a wake-up signal (WUS);
when the terminal device switches from the first DL BWP to a second DL BWP to receive data within the monitoring occasion of the WUS configured on the first DL BWP and before a discontinuous reception (DRX) ON duration timer starts, starting, by the terminal device, the DRX ON duration timer at a starting moment of the DRX ON duration timer to enter a DRX activation period;
where the second DL BWP is a BWP that is not configured with a monitoring occasion of the WUS.

In the second aspect, there is provided a terminal device, including:
a communication unit, configured to receive data on a first downlink (DL) bandwidth part (BWP); where the first DL BWP is a BWP configured with a monitoring occasion of a wake-up signal (WUS); and
a processing unit, configured to, when switching from the first DL BWP to a second DL BWP to receive data within the monitoring occasion of the WUS configured on the first DL BWP and before a discontinuous reception (DRX) ON duration timer starts, start the DRX ON duration timer at a starting moment of the DRX ON duration timer to enter a DRX activation period;
where the second DL BWP is a BWP that is not configured with a monitoring occasion of the WUS.

In a third aspect, there is provided a terminal device, including: a processor and a memory for storing a computer program that can run on the processor,
where the memory is configured to store a computer program, and the processor is used to call and run the computer program stored in the memory to execute the steps of the method.

In a fourth aspect, there is provided a chip, including a processor, configured to call and run a computer program from a memory, so that a device installed with the chip executes the aforementioned method.

In a fifth aspect, there is provided a computer-readable storage medium, the computer-readable storage medium is configured to store a computer program, and the computer program enables a computer to execute the steps of the aforementioned method.

In a sixth aspect, there is provided a computer program product, including computer program instructions, which cause a computer to execute the aforementioned method.

In a seventh aspect, there is provided a computer program, which causes a computer to execute the aforementioned method.

By adopting the above solutions, it can be realized that if a DL BWP switching occurs in the terminal device during the time period when the terminal device is monitoring WUS, and the terminal device does not configure WUS monitoring occasion on the DL BWP after switching, the terminal device starts the DRX ON duration timer at the subsequent starting moment of the DRX ON duration timer. In this way, for the scenario where the WUS monitoring occasion is not configured in the BWP after switching, the processing solution is provided for how to control the terminal device to start the DRX ON duration timer.

DETAILED DESCRIPTION

In order to understand the characteristics and technical content of the embodiments of the present disclosure in more detail, the implementation of the embodiments of the present disclosure will be described in detail below with reference to the accompanying drawings. The attached drawings are for reference and description purposes only, and are not used to limit the embodiments of the present disclosure.

The technical solutions in the embodiments of the present application will be described below in conjunction with the drawings in the embodiments of the present application. Obviously, the described embodiments are part of the embodiments of the present application, rather than all of the embodiments. Based on the embodiments in the present application, all other embodiments obtained by a person of ordinary skill in the art without creative work shall fall within the protection scope of the present application.

The technical solutions of the embodiments of the present application may be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or 5G system, etc.

Figure 1:
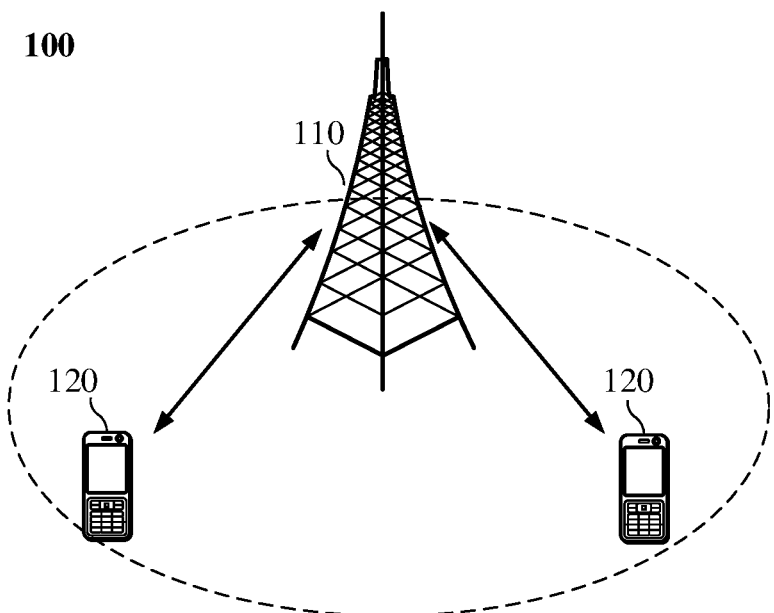
FIG. 1 is a first schematic diagram of a communication system architecture provided by an embodiment of the present application.

Exemplarily, the communication system 100 applied in the embodiments of the present application is shown in FIG. 1. The communication system 100 may include a network device 110, and the network device 110 may be a device that communicates with a terminal device 120 (or called a communication terminal or a terminal). The network device 110 may provide communication coverage for a specific geographic area, and may communicate with a terminal device(s) located in the coverage area. Optionally, the network device 110 may be a base station (Base Transceiver Station, BTS) in a GSM system or a CDMA system, or a base station (NodeB, NB) in a WCDMA system, or an evolved base station (Evolutional Node B, eNB or eNodeB) in an LTE system, or a wireless controller in the Cloud Radio Access Network (CRAN), or the network device may be a mobile switching center, a relay station, an access point, a vehicle-mounted device, a wearable device, a hub, a switch, a bridge, a router, a network-side device in 5G networks, or a network device in the future evolution of the Public Land Mobile Network (PLMN), etc.

The communication system 100 also includes at least one terminal device 120 located within the coverage area of the network device 110. As used herein, the "terminal device" includes, but is not limited to, connection via wired lines, such as via Public Switched Telephone Networks (PSTN), Digital Subscriber Line (DSL), digital cables, and direct cable connections; and/or another data connection/network; and/or via a wireless interface, such as for cellular networks, Wireless Local Area Networks (WLAN), digital TV networks such as DVB-H networks, satellite networks, AM-FM broadcast transmitter; and/or an apparatus of another terminal device that is set to receive/send communication signals; and/or Internet of Things (IoT) equipment. A terminal device set to communicate through a wireless interface may be referred to as a "wireless communication terminal", a "wireless terminal" or a "mobile terminal".

Optionally, Device to Device (D2D) communication may be performed between the terminal devices 120.

It should be understood that the terms "system" and "network" in the present disclosure are often used interchangeably in the present disclosure. The term "and/or" in the present disclosure is only an association relationship that describes the associated objects, which means that there may be three relationships, for example, A and/or B may mean the following three situations: A exists alone, A and B exist at the same time, and B exists alone.

In addition, the character "/" in the present disclosure generally indicates that the associated objects before and after are in an "or" relationship.

In order to understand the characteristics and technical content of the embodiments of the present disclosure in more detail, the implementation of the embodiments of the present disclosure will be described in detail below with reference to the accompanying drawings. The attached drawings are for reference and description purposes only, and are not used to limit the embodiments of the present disclosure.

Figure 2:
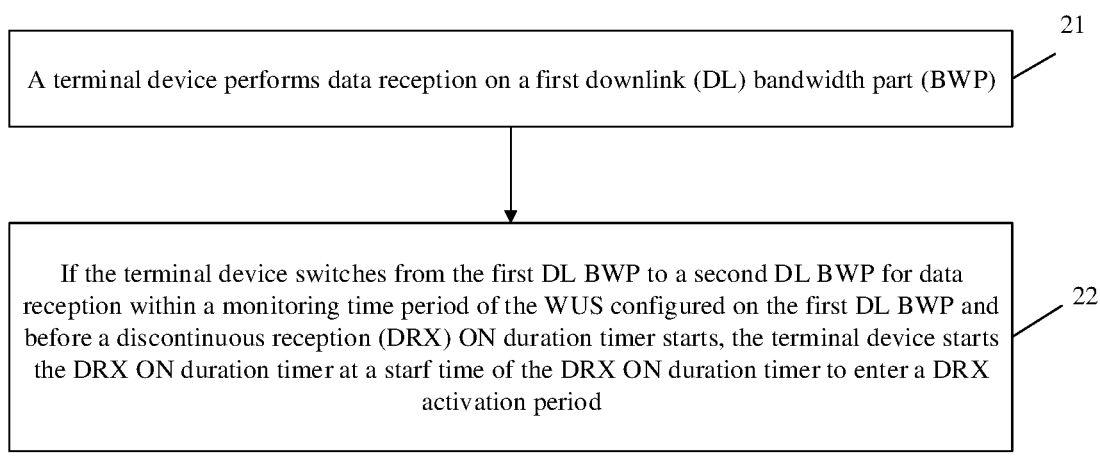
FIG. 2 is a schematic flowchart of a discontinuous reception processing method provided by an embodiment of the present disclosure.

The embodiments of the present disclosure provide a discontinuous reception processing method. As shown in FIG. 2, the method includes the followings steps.

In step 21, the terminal device receives data on a first DownLink (DL) BandWidth Part (BWP); where the first DL BWP is a BWP configured with a monitoring occasion of a Wake-up Signal (WUS).

In step 22, if the terminal device switches from the first DL BWP to a second DL BWP for data reception within the monitoring occasion of WUS configured on the first DL BWP and before the Discontinuous Reception (DRX) ON duration timer is started, the terminal device starts the DRX ON duration timer at a starting moment of the DRX ON duration timer to enter a DRX activation period;

where the second DL BWP is a BWP that is not configured with a monitoring occasion of WUS.

In 5G NR, the network device may configure the DRX function for the terminal device, so that the terminal can monitor the PDCCH non-continuously, so as to save the power of the terminal. In the configuration of the DRX function, each Media Access Control (MAC) entity has one DRX configuration.

In the scenario of the present embodiment, WUS is introduced for the DRX in connected state. The WUS is designed based on PDCCH. The terminal device monitors WUS on the monitoring occasion of WUS within the monitoring occasion that is before the starting moment of the DRX ON duration timer (drx-ondurationTimer) and after a configured WUS offset time point. The terminal device decides whether to start the DRX ON duration timer (drx-ondurationTimer) at the subsequent starting moment of the DRX ON duration timer (drx-ondurationTimer) according to the WUS indication, and then enters the DRX active time, to monitor the PDCCH non-continuously.

The monitoring occasion of WUS is a parameter configured by the network device for the terminal device. For example, some DL BWPs of the terminal device may be configured with monitoring occasions of WUS through the network device, while some DL BWPs are not configured with monitoring occasions of WUS.

The aforementioned monitoring time range of WUS is determined based on the WUS offset. For example, based on the WUS offset, a starting point may be obtained by subtracting the WUS offset from a certain time point, and the monitoring time range of WUS is determined to be from the starting point to a position of a certain preset time point. The preset time point may be a starting time point of the DRX activation period, or it may also be other time point, which is not exhaustively listed in the present embodiment.

The WUS offset is a parameter configured by the network device for the terminal device. For example, such information may be carried through RRC, DownLink Control Information (DCI), or such information may also be carried through other downlink signaling.

In addition, WUS offset may be based on terminal device configuration (that is, each terminal device is configured with one WUS offset), or may be based on BWP configuration (that is, each BWP is configured with one WUS offset), or it may also be based on other unit configuration, which is not exhaustively listed in the present embodiment.

Regarding the BWP in the foregoing embodiments, especially for the 5G NR BWP, the description is as follows.

In order to be able to provide a greater data transmission rate and improve user experience, 5G NR further increases the system bandwidth on the basis of 4G. In 5G NR, for the frequency bands below 6 GHz, the maximum bandwidth supported by a single carrier is 100 MHz; for the frequency bands above 6 GHz, the maximum bandwidth supported by a single carrier is 400 MHz. For a large carrier bandwidth, such as 100HMz, the bandwidth that the terminal device needs to use is often very limited. If the terminal device always performs detection and measurement on the entire bandwidth, it will bring great challenges to the terminal power consumption, which is not conducive to save electricity by the terminal. Therefore, the concept of BWP is introduced in 5G NR, that is, a part of the continuous bandwidth is divided out from the entire large-bandwidth carrier for the terminal device to send and receive data. The terminal device only needs to perform related operations within this part of the bandwidth configured by the network, so as to achieve the effect of terminal energy saving.

Based on the 5G NR Rel-15 standard, for each serving cell of a terminal device, the network RRC may configure one or more BWPs for the terminal on this serving cell, and the maximum number of configurable BWPs may be 4 (this number may be more or may be less, which is not limited here). At each moment, the terminal device can only have one activated DL BWP and one activated UpLink (UL) BWP on this serving cell, and the terminal device can only send and receive data on the activated BWP.

Considering factors such as the diversity of terminal services and the differences in different service characteristics, the terminal device may have the need to adjust BWP.

For example, when the service volume is large and high-speed services are desired, a large-bandwidth BWP needs to be used for data transmission for this terminal device. When the service volume is small, a small bandwidth BWP may be used for data transmission for this terminal device. The BWP activated by the terminal device on this serving cell may be changed through the BWP switching, and the BWP switching scenarios may have the following 4 scenarios.

The first type of scenario is BWP switching based on PDCCH: BWP switching controlled by a network device. The network notifies the terminal device of the target BWP for switching by sending the PDCCH to the terminal.

The second type of scenario is BWP switching based on RRC (re)configuration: BWP switching controlled by a network device. The identification of the first activated downlink BWP (firstActiveDownlinkBWP-Id) or/and identification of the first activated uplink BWP (firstActiveUplinkBWP-Id) is carried in the RRC (re)configuration message to instruct the terminal device to switch the activated BWP to firstActiveDownlinkBWP-Id or/and firstActiveUplinkBWP-Id.

The third type of scenario is BWP switching based on timer timeout, which is an implicit BWP switching.

The fourth type of scenario is: BWP switching caused by random access initialization, which occurs during the RACH initialization process.

Specifically, if the terminal device is not configured with a random access occasion (PRACH occasion) on the currently activated UL BWP, the terminal device automatically switches the UL BWP to the initial UL BWP; and if the serving cell of the terminal device is SpCell, the terminal device also switches DL BWP to the initial DL BWP.

If the terminal device has PRACH occasion configuration on the currently activated UL BWP, and the serving cell of the terminal device is SpCell, and the bwp-Id of the currently activated DL BWP of the terminal device is different from the bwp-Id of the activated UL BWP, the terminal device switches to the DL BWP with the same bwp-Id as the currently activated UL BWP.

It should be pointed out that, since the first and second scenarios mentioned above are mainly BWP switchings triggered by the network device, the present embodiment does not involve the starting problem of the DRX On duration timer in these two scenarios; the present embodiment mainly for the third and fourth scenarios, and the following descriptions are respectively given for the processing manner if there is a BWP switching.

First Example

For the foregoing third scenario, the BWP switching based on the timeout of the timer is described, which is an implicit BWP switching. This kind of BWP switching is specifically as follows: the network device configures a timer BWP inactivity timer (bwp-InactivityTimer) for each serving cell of the terminal device. If the DL BWP currently activated by the terminal device is a BWP other than the default BWP and the initial DL BWP, each time the terminal device receives a PDCCH indicating the terminal device's uplink or downlink scheduling on the currently activated BWP, or the terminal device receives a PDCCH indicating the terminal device to perform uplink or downlink scheduling on the currently activated BWP, the timer bwp-InactivityTimer is started or restarted. If the timer bwp-InactivityTimer expires, the terminal device automatically switches to the default BWP or the initial DL BWP, where both the default BWP and the initial BWP are determined by the RRC configuration.

Based on this, the solution provided by this example is: a BWP switching occurs in the terminal device during the monitoring time range of WUS, and the trigger reason of the BWP switching is (BWP inactivity timer) bwp-InactivityTimer timeout, because the terminal device is not configured with WUS on the DL BWP after switching, the terminal device starts the DRX ON duration timer at the subsequent starting moment of the DRX ON duration timer to enter the DRX activation period.

Figure 3:
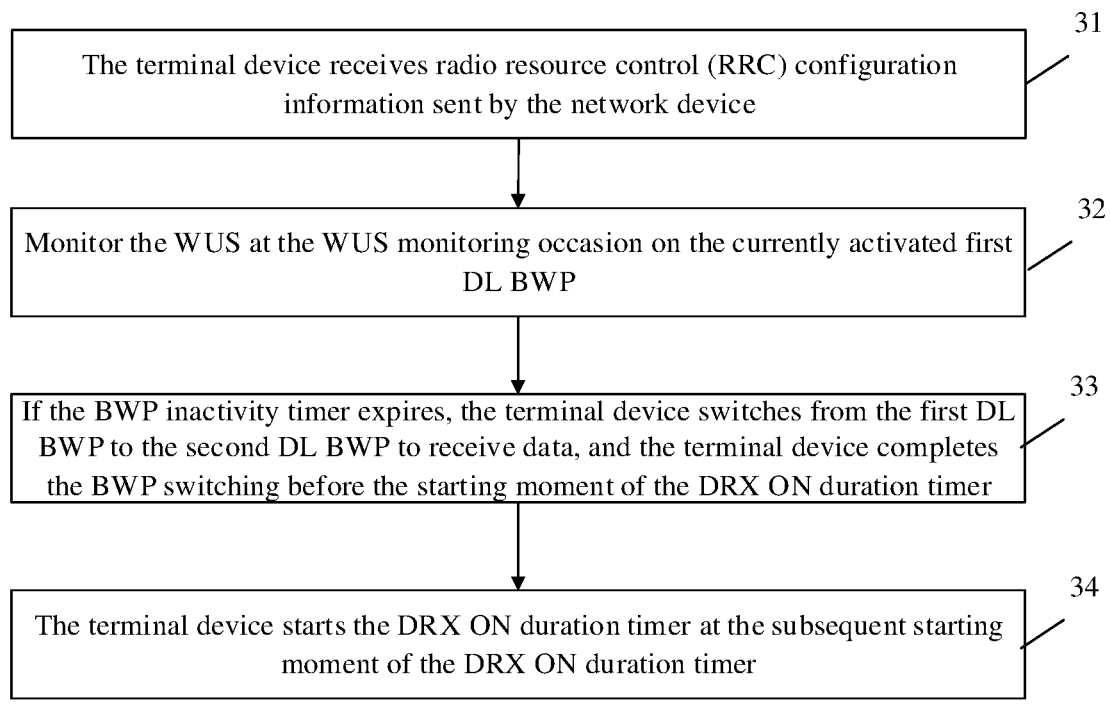
FIG. 3 is a processing flowchart in an example of a discontinuous reception processing method provided by an embodiment of the present disclosure.

For details, FIG. 3 may be referred to, and the implementation process is as follows.

In step 31, the terminal device receives radio resource control (RRC) configuration information sent by the network device.

The RRC configuration information carries at least one of the following: a DRX configuration parameter, a BWP configuration parameter, and a WUS configuration parameter.

The DRX configuration parameter includes: a long DRX cycle and a DRX ON duration timer. It should be pointed out that this example is mainly for the long DRX cycle, and may also be applied to the short DRX cycle and its corresponding DRX-On duration timer.

The BWP configuration parameter includes at least one of the following: at least one DL BWP and a BWP inactivity timer.

Specifically, one DRX configuration parameter is configured for each MAC entity.

DRX ON duration timer (drx-onDurationTimer) is used for the duration from waking up of the terminal device at the beginning of a DRX Cycle.

The configuration of the aforementioned long DRX cycle may specifically include: DRX long cycle start offset (drx-LongCycleStartOffset) used for configuring the Long DRX cycle; and a subframe offset at the beginning of the Long DRX cycle and a subframe offset at the beginning of the Short DRX Cycle.

In addition to the aforementioned long DRX cycle configuration and DRX ON duration timer, the DRX configuration parameter may also include at least one of the following:
- a DRX slot offset (drx-SlotOffset), which is a time delay for the terminal device to start drx-onDurationTimer;
- a DRX inactivity timer (drx-InactivityTimer), which is a duration that the terminal device keeps monitoring the PDCCH after receiving a PDCCH indicating uplink initial transmission or downlink initial transmission;
- a DRX-downlink retransmission timer (drx-RetransmissionTimerDL), which is the longest duration for the terminal device to monitor the PDCCH indicating the downlink retransmission scheduling, where except for the broadcast HARQ process, each downlink HARQ process corresponds to one drx-RetransmissionTimerDL;
- a DRX uplink retransmission timer (drx-RetransmissionTimerUL), which is the longest duration for the terminal device to monitor the PDCCH indicating uplink retransmission scheduling, where each uplink HARQ process corresponds to one drx-RetransmissionTimerUL;
- a short DRX cycle (drx-ShortCycle), which is an optional configuration;
- a DRX short cycle timer (drx-ShortCycleTimer), which is the duration during which the terminal device is in the Short DRX cycle (and has not received any PDCCH), and is an optional configuration;
- a DRX HARQ-RTT downlink timer (drx-HARQ-RTT-TimerDL), the minimum waiting time that the terminal device expects to receive the PDCCH indicating the downlink scheduling; where except for the broadcast HARQ process, each downlink HARQ process corresponds to one drx-HARQ-RTT-TimerDL;
- a DRX HARQ-RTT uplink timer (drx-HARQ-RTT-TimerUL), which is the minimum waiting time that the terminal device expects to receive the PDCCH indicating uplink scheduling, where each uplink HARQ process corresponds to one drx-HARQ-RTT-TimerUL.

In this example, at least one DL BWP in the BWP configuration parameters may include at least: an initial DL BWP.

In addition, at least one DL BWP in the BWP configuration parameter may also include: a default DL BWP; specifically, it may be an identification of the default DL BWP. Further, the at least one DL BWP may also include one or more DL BWPs other than the aforementioned initial DL BWP and the default DL BWP. Moreover, in this example, a BWP inactivity timer is also included.

That is to say, the at least one DL BWP of the BWP configuration parameter may include: one initialDownlinkBWP. Optionally, one defaultDownlinkBWP-Id may also be configured.

In addition, at least one DL BWP may also be configured. The timer bwp-InactivityTimer is configured; each cell may correspond to one BWP inactivity timer, and then what is configured for the terminal device in the RRC configuration information may be considered as the BWP inactivity timer of the cell where the terminal device is currently located.

WUS monitoring occasion (WUS time domain range) configuration: in the included first type of DL BWP and second type of DL BWP, the first type of DL BWP may be configured with the monitoring time range of WUS, and the second type of DL BWP is the BWP not configured with the monitoring time range of WUS.

In other words, the first type of DL BWP and the second type of DL BWP configured in the WUS configuration parameter may be part or all of at least one DL BWP included in the BWP configuration parameter.

For example, DL BWPs 1, 2, 3, and 4 are configured in the BWP configuration parameter; WUS monitoring occasion is configured for DL BWP 1 and DL BWP 2 in the WUS configuration parameter, then DL BWP 1 and DL BWP 2 may be understood as the first type of DL BWP corresponding to the WUS configuration parameter; but for DL BWP 3 and DL BWP 4, no WUS monitoring occasion is configured, then DL BWP 3 and DL BWP 4 may be understood as the second type of DL BWP in the WUS configuration parameter.

In this example, the second DL BWP may be any one of the second type of DL BWP. And the second type of DL BWP may include an initial DL BWP and a default DL BWP. Then the solution provided in this example may be considered as switching from the first DL BWP to the second DL BWP as long as the BWP inactivity timer expires.

The second DL BWP is: the initial DL BWP or the default DL BWP.

That is to say, in the aforementioned WUS configuration parameter, WUS monitoring occasion is configured for at least one first type of DL BWP except for initialDownlinkBWP and defaultDownlinkBWP-Id; and for the second type of DL BWP of initialDownlinkBWP and defaultDownlinkBWP-Id (or other DL BWP), no WUS monitoring occasion is configured.

In this example, in a preferred situation, the second DL BWP is: the initial DL BWP or the default DL BWP. All the DL BWPs that are not configured with the WUS monitoring time range are within the protection scope of the second DL BWP in this example.

In step 32: based on the network configuration, the terminal device monitors the WUS at the WUS monitoring occasion on the currently activated first DL BWP, and the currently activated first DL BWP is either the initialDownlinkBWP or the defaultDownlinkBWP-Id. That is to say, the currently activated first DL BWP is any one of the first type of DL BWP except the second type of DL BWP.

In step 33, if the BWP inactivity timer expires, the terminal device switches from the first DL BWP to the second DL BWP to receive data. That is, the terminal device switches to the initial DL BWP or the default DL BWP, and the terminal device completes the BWP switching before the starting moment of the DRX ON duration timer (drx-onDurationTimer).

It can be understood that the terminal device switches to any one of the second type of DL BWP. In combination with the foregoing third BWP switching scenario, the second DL BWP in the solution provided in this example is the initial DL BWP or the default DL BWP. More specifically, the terminal device may determine the identification of the second DL BWP, i.e., the identification of the initial DL BWP or the identification of the default DL BWP, according to the BWP configuration parameter and the WUS configuration parameter of the foregoing step 31.

More specifically, the terminal device may determine to switch from the currently activated first DL BWP to the initial DL BWP or the default DL BWP according to the BWP configuration parameter and WUS configuration parameter of the foregoing step 31; based on the identification of the initial DL BWP or the default DL BWP and the WUS configuration parameter, the terminal device determines the initial DL BWP or the default DL BWP as the BWP not configured with WUS monitoring occasion; then the terminal device switches from the first DL BWP to the second DL BWP before the starting moment of the DRX ON duration timer, to perform data reception.

In step 34, the terminal device starts the DRX ON duration timer (drx-onDurationTimer) at the subsequent starting moment of the DRX ON duration timer (drx-onDurationTimer).

It should be pointed out that in the foregoing step 33, if the BWP switching is completed after drx-onDurationTimer, the processing may be performed according to the originally configured WUS monitoring occasion.

For example, WUS monitoring may be performed, and whether to start the DRX ON duration timer may be determined according to the WUS, etc., which will not be repeated here.

Second Example

This example is mainly for the third scenario of the aforementioned BWP switching, which may be as follows: the terminal device has a BWP switching within the time range of monitoring WUS, and the triggering cause of the BWP switching is the DL BWP switching caused by the RACH process, and the terminal device is not configured with WUS on the DL BWP after switching, then the terminal device starts the drx-onDutaionTimer at the subsequent starting moment of the drx-onDutaionTimer.

Figure 4:
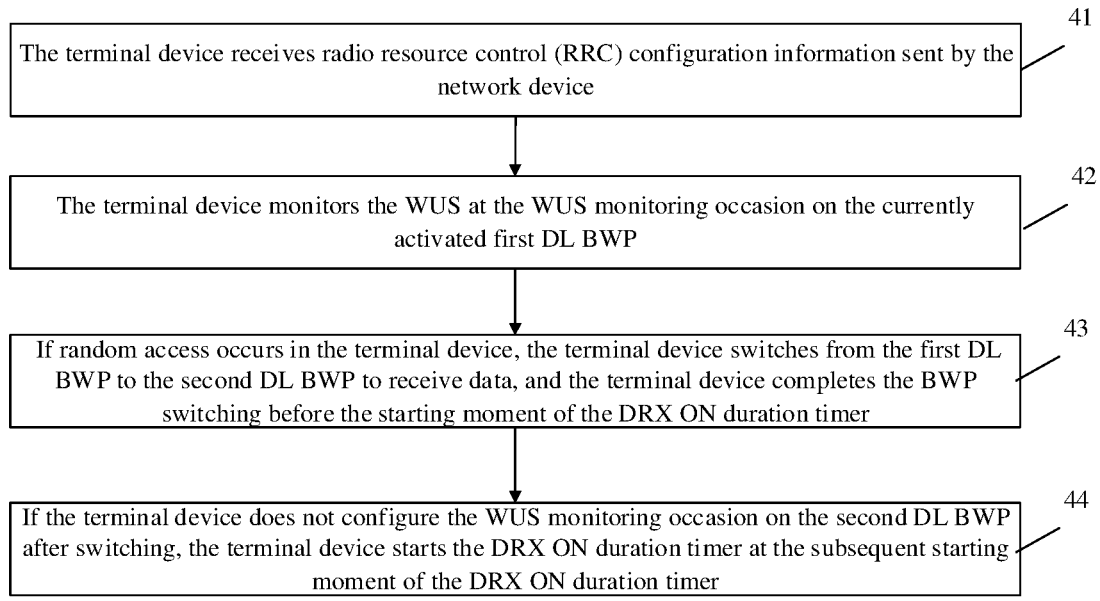
FIG. 4 is a processing flowchart in another example of a discontinuous reception processing method provided by an embodiment of the present disclosure.

With reference to FIG. 4, this example may include the following steps.

In step 41, the terminal device receives radio resource control (RRC) configuration information sent by the network device;

where the RRC configuration information carries at least one of the following: a DRX configuration parameter, a BWP configuration parameter, and a WUS configuration parameter.

In this example, the content contained in the DRX configuration parameter is the same as in the first example, and will not be repeated here.

The BWP configuration parameter is different from the first example. In this example, the BWP configuration parameter may include: one initial DL BWP (initialDownlinkBWP).

In addition, at least one DL BWP other than the initial DL BWP may also be configured. Furthermore, the BWP inactivity timer (bwp-InactivityTimer) may also be configured according to needs. Regarding this parameter, the BWP inactivity timer may be configured or not configured in this example.

WUS monitoring occasion (WUS time domain range) configuration: WUS monitoring occasion is configured on part of the DL BWPs; similarly, this part of the DL BWPs configured with WUS monitoring occasion is the first type of DL BWP; and the rest SL BWP not configured with WUS monitoring occasion may be the second type of DL BWP.

In step 42, the terminal device monitors the WUS at the WUS monitoring occasion on the currently activated first DL BWP.

In step 43, if random access occurs in the terminal device, the terminal device switches from the first DL BWP to the second DL BWP to receive data.

In other words, the terminal device initiates the random access (RACH) process, triggers the DL BWP switching during the random access (RACH) initialization process, and switches from the first DL BWP to the second DL BWP, and the terminal device completes the BWP switching before the starting moment of the DRX ON duration timer.

In step 44, if the terminal device does not configure the WUS monitoring occasion on the second DL BWP after switching, the terminal device starts the DRX ON duration timer at the subsequent starting moment of the DRX ON duration timer, and then enters the DRX activation period to start PDCCH monitoring.

The second DL BWP is: the initial DL BWP or the DL BWP with the same identification as the currently activated UL BWP.

It should be further noted that since this example is for the aforementioned fourth BWP switching scenario, if the terminal device has a PRACH occasion configuration on the currently activated UL BWP, the serving cell of the terminal device is SpCell, and the bwp-Id of the currently activated DL BWP of the terminal device is different from the bwp-Id of the activated UL BWP, then the terminal device switches to the DL BWP with the same identification as the currently activated UL BWP. At this time, when switching to the DL BWP with the same identification as the currently activated UL BWP, it may be determined whether the DL BWP has a configured WUS monitoring occasion according to the WUS configuration parameter. If the DL BWP corresponding to the UL BWP and having the same BWP identification as the UL BWP is the second type of DL BWP, that is, is the DL BWP that is not configured with the WUS monitoring occasion, then the subsequent steps provided in this example are performed. If switching to a DL BWP with the same identification as the currently activated UL BWP, it may be determined whether the DL BWP has a configured WUS monitoring occasion according to the WUS configuration parameter. If the DL BWP corresponding to the UL BWP and having the same BWP identification as the UL BWP is the first type of DL BWP, that is, is the DL BWP configured with WUS monitoring occasion, then WUS monitoring is performed according to the corresponding WUS monitoring occasion configured by the DL BWP, which is not described in detail in this example.

Another difference from the first example lies in that, in this example, the BWP configuration parameter may also include a UL BWP configuration parameter. Specifically, the UL BWP configuration parameter may include: initialUplinkBWP, and in addition, at least one UL BWP is also configured.

Here, adding the UL BWP configuration parameter is mainly for another sub-scenario in the foregoing fourth BWP switching scenario: if the terminal device does not configure a random access occasion (PRACH occasion) on the currently activated UL BWP, the terminal device automatically switches the UL BWP to the initial UL BWP; if the serving cell of the terminal device is SpCell, the terminal device simultaneously switches the DL BWP to the initial DL BWP. That is to say, in this case, according to the configured initial UL BWP, it may be further determined that the switching of the downlink (DL) BWP is also switched to the initial DL BWP. At this time, when switching to the initial DL BWP, if the initial DL BWP is determined to be the second type of DL BWP (that is, the BWP that is not configured with WUS monitoring occasion) according to the WUS configuration parameter, the subsequent steps provided in this example are performed. When switching to the initial DL BWP, if the initial DL BWP is determined to be the first type of DL BWP (that is, the BWP configured with WUS monitoring occasion) according to the WUS configuration parameter, then WUS monitoring may be performed according to the corresponding WUS monitoring occasion configured by the DL BWP, which is not elaborated in this example.

After the foregoing first and second examples, the terminal device starts the DRX ON duration timer at the subsequent starting moment of the DRX ON duration timer, and then the terminal device needs to monitor the PDCCH at the DRX Active Time. Among them, the DRX Active Time includes the following cases.

Case 1: any one of five timers, i.e., drx-onDurationTimer, drx-InactivityTimer, drx-RetransmissionTimerDL, drx-RetransmissionTimerUL, and ra-ContentionResolutionTimer, is running.

Case 2: a Scheduling Request (SR) is sent on the PUCCH and it is in a pending state.

Case 3: in a contention-based random access process, the terminal has not received an initial transmission indicated by the PDCCH scrambled by C-RNTI after successfully receiving the random access response.

Further, the terminal device may also determine the time to start the drx-onDurationTimer, which may be determined according to the DRX configuration parameter.

For example, it is further determined to start the DRX ON duration timer (drx-onDurationTimer) according to whether it is currently in a short DRX cycle or a long DRX cycle. The details are as follows.

If Short DRX Cycle is used, and the current subframe satisfies [(SFN×10)+subframe number] modulo (drx-ShortCycle)=(drx-StartOffset) modulo (drx-ShortCycle); or if Long DRX Cycle is used, and the current subframe satisfies [(SFN×10)+subframe number] modulo (drx-LongCycle)= drx-StartOffset;

then the drx-onDurationTimer is started at a moment after drx-SlotOffset slots from the beginning of the current subframe.

Figure 5:
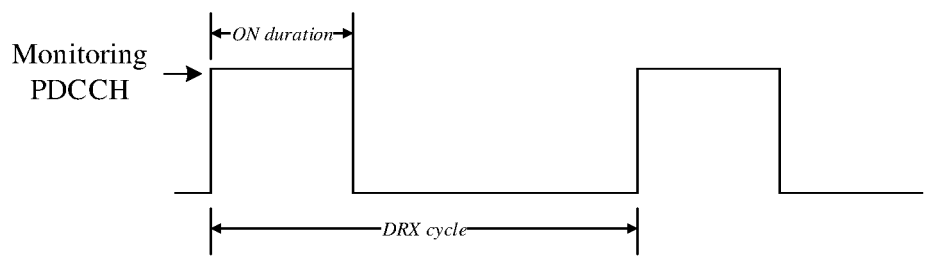
FIG. 5 is a schematic diagram of a DRX duration in a DRX cycle.

For example, as shown in FIG. 5, after the starting moment is determined, the DRX ON duration timer is started, and enters "ON" duration phrase in the DRX cycle.

It may be seen that by adopting the above solution, it can be realized that if a DL BWP switching occurs in the terminal device during the time period of monitoring WUS, and the terminal device does not configure WUS monitoring occasion on the DL BWP after switching, the terminal device may start the DRX ON duration timer at the subsequent starting moment of the DRX ON duration timer. In this way, for the scenario where the WUS monitoring occasion is not configured in the BWP after switching, the solution is provided for how to control the terminal device to start the DRX ON duration timer.

Figure 6:
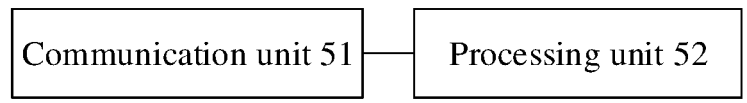
FIG. 6 is a schematic diagram of a composition structure of a terminal device provided by an embodiment of the present disclosure.

The embodiment of the present disclosure provides a terminal device. As shown in FIG. 6, the terminal device includes:

a communication unit 51, configured to receive data on a first DownLink (DL) BandWidth Part (BWP); where the first DL BWP is configured with a BWP configured with a monitoring occasion of Wake-up Signal (WUS); and a processing unit 52, configured to switch from the first DL BWP to a second DL BWP to receive data within a monitoring time range of the WUS configured on the first DL BWP and before the Discontinuous Reception (DRX) ON duration timer starts, then start the DRX ON duration timer at a starting moment of the DRX ON duration timer to enter a DRX activation period;

where the second DL BWP is a BWP that is not configured with a monitoring occasion of WUS.

First Example

For the foregoing third scenario, the BWP switching based on the timeout of the timer is described, which is an implicit BWP switching. This kind of BWP switching is specifically as follows: the network device configures a timer BWP inactivity timer (bwp-InactivityTimer) for each serving cell of the terminal device. If the DL BWP currently activated by the terminal device is a BWP other than the default BWP and the initial DL BWP, each time the terminal device receives a PDCCH indicating the terminal device's uplink or downlink scheduling on the currently activated BWP, or the terminal device receives a PDCCH indicating the uplink or downlink scheduling of the terminal device on the currently activated BWP, the timer bwp-InactivityTimer is started or restarted. If the timer bwp-InactivityTimer expires, the terminal device automatically switches to the default BWP or the initial DL BWP, where both the default BWP and the initial BWP are determined by the RRC configuration.

Based on this, the solution provided by this example is: BWP switching occurs within the monitoring time range of monitoring WUS, and the triggering cause of the BWP switching is (BWP deactivation timer) bwp-InactivityTimer timeout, because the terminal device does not configure WUS on the DL BWP after switching, the terminal device starts the DRX ON duration timer at the subsequent starting moment of the DRX ON duration timer to enter the DRX activation period.

The communication unit 51 is configured to receive radio resource control (RRC) configuration information sent by the network device.

The RRC configuration information carries at least one of the following: a DRX configuration parameter, a BWP configuration parameter, and a WUS configuration parameter.

The DRX configuration parameter includes: a long DRX cycle and a DRX ON duration timer. It should be pointed out that this example is mainly for the long DRX cycle, and may also be applied to the short DRX cycle and its corresponding DRX-On duration timer.

The BWP configuration parameter includes at least one of the following: at least one DL BWP and a BWP inactivity timer.

The WUS configuration parameter includes: the first type of DL BWP configured with the monitoring occasion of the wake-up signal (WUS), and the second type of DL BWP not configured with the monitoring occasion of the WUS; where the first type of DL BWP includes the first DL BWP; the second type of DL BWP includes a second DL BWP; and the first type of DL BWP and the second type of BWP are DL BWPs in the at least one DL BWP.

The second DL BWP is: the initial DL BWP or the default DL BWP.

If the BWP inactivity timer (bwp-InactivityTimer) expires, the processing unit 52 switches from the first DL BWP to the second DL BWP, that is, the terminal device switches to the initial DL BWP or the default DL BWP, and the BWP switching is completed before the starting moment of the DRX ON duration timer (drx-onDurationTimer).

The processing unit 52 is configured to start the DRX ON duration timer drx-onDurationTimer at the subsequent starting moment of the DRX ON duration timer drx-onDurationTimer.

Second Example

This example is mainly for the third scenario of the aforementioned BWP switching, which may be as follows: a BWP switching occurs in the terminal device within the time range of monitoring WUS, and the triggering cause of the BWP switching is the DL BWP switching caused by the RACH process, and the terminal device does not configure WUS on the DL BWP after switching, then the terminal device starts the drx-onDutaionTimer at the subsequent starting moment of the drx-onDutaionTimer.

The communication unit 51 receives radio resource control (RRC) configuration information sent by the network device.

The RRC configuration information carries at least one of the following: a DRX configuration parameter, a BWP configuration parameter, and a WUS configuration parameter.

In this example, the content contained in the DRX configuration parameter is the same as in the first example, and will not be repeated here.

The BWP configuration parameter is different from the first example. In this example, the BWP configuration parameter may include: one initial DL BWP (initialDownlinkBWP).

In addition, at least one DL BWP other than the initial DL BWP may also be configured.

In addition, the BWP inactivity timer (bwp-InactivityTimer) may also need to be configured. Regarding this parameter, the BWP inactivity timer may be configured or not configured in this example.

WUS monitoring occasion (WUS time domain range) configuration: WUS monitoring occasion is configured on part of the DL BWPs; similarly, this part of the DL BWPs configured with WUS monitoring occasion is the first type of DL BWP; and the rest SL BWP not configured with WUS monitoring occasion may be the second type of DL BWP.

The communication unit monitors the WUS at the WUS monitoring occasion on the currently activated first DL BWP.

The random access RACH process is initiated, the DL BWP switching is triggered during the random access RACH initialization process, and the processing unit 52 controls to switch from the first DL BWP to the second DL BWP, and completes the BWP switching before the starting moment of the DRX ON duration timer.

If the WUS monitoring occasion is not configured on the second DL BWP after switching, the processing unit 52 starts the DRX ON duration timer at the subsequent starting moment of the DRX ON duration timer, and then enters the DRX activation period, and starts to perform the PDCCH monitoring.

Another difference from the first example is that, in this example, the BWP configuration parameter may also include an UL BWP configuration parameter. Specifically, the UL BWP configuration parameter may include: initialUplinkBWP, and in addition, at least one UL BWP is also configured.

It may be seen that by adopting the above scheme, it can be realized that if a DL BWP switching occurs in the terminal device during the time period of monitoring WUS, and the terminal device does not configure WUS monitoring occasion on the DL BWP after switching, the terminal device starts the DRX ON duration timer at the subsequent starting moment of the DRX ON duration timer. In this way, for the scenario where the WUS monitoring occasion is not configured in the BWP after switching, the solution is provided for how to control the terminal device to start the DRX ON duration timer.

Figure 7:
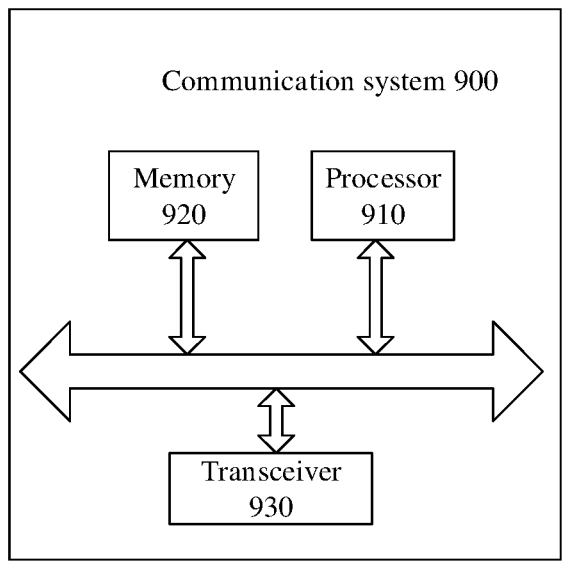
FIG. 7 is a schematic diagram of a composition structure of a communication device provided by an embodiment of the present disclosure.

FIG. 7 is a schematic structural diagram of a communication device 900 provided by an embodiment of the present disclosure. The communication device in this embodiment may be specifically the terminal device in the foregoing embodiments. The communication device 900 shown in FIG. 7 includes a processor 910, and the processor 910 can call and run a computer program from a memory to implement the method in the embodiments of the present disclosure.

Optionally, as shown in FIG. 7, the communication device 900 may further include a memory 920. The processor 910 can call and run a computer program from the memory 920 to implement the method in the embodiments of the present disclosure.

The memory 920 may be a separate device independent of the processor 910, or may be integrated in the processor 910.

Optionally, as shown in FIG. 7, the communication device 900 may further include a transceiver 930, and the processor 910 may control the transceiver 930 to communicate with other device(s). Specifically, it may send information or data to other device(s), or receive information or data sent by other device(s).

The transceiver 930 may include a transmitter and a receiver. The transceiver 930 may further include an antenna, and the number of antennas may be one or more.

Optionally, the communication device 900 may specifically be the network device according to the embodiments of the present disclosure, and the communication device 900 may implement the corresponding processes implemented by the network device in each method of the embodiments of the present disclosure. For brevity, details are not repeated here.

Optionally, the communication device 900 may specifically be the terminal device or the network device according to the embodiments of the present disclosure, and the communication device 900 may implement the corresponding processes implemented by the mobile terminal/terminal device in each method of the embodiments of the present disclosure. For brevity, details are not repeated here.

Figure 8:
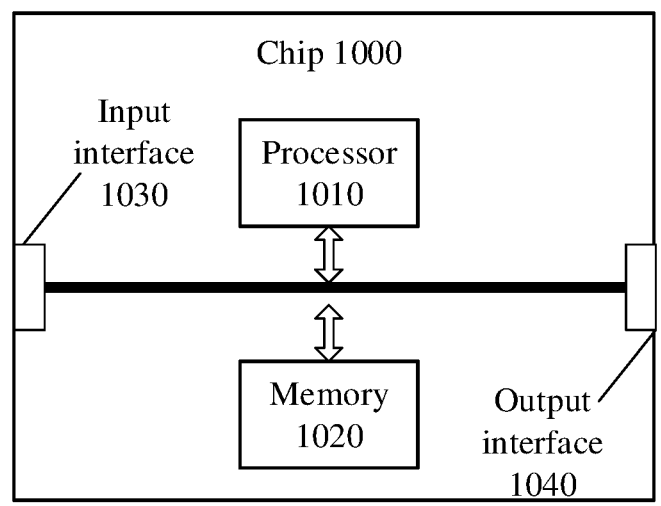
FIG. 8 is a schematic block diagram of a chip provided by an embodiment of the present application.

FIG. 8 is a schematic structural diagram of a chip according to an embodiment of the present disclosure. The chip 1000 shown in FIG. 8 includes a processor 1010, and the processor 1010 can call and run a computer program from a memory to implement the method in the embodiments of the present disclosure.

Optionally, as shown in FIG. 8, the chip 1000 may further include a memory 1020. The processor 1010 can call and run a computer program from the memory 1020 to implement the method in the embodiments of the present disclosure.

The memory 1020 may be a separate device independent of the processor 1010, or may be integrated in the processor 1010.

Optionally, the chip 1000 may further include an input interface 1030. The processor 1010 can control the input interface 1030 to communicate with other device(s) or chip(s), and specifically, can obtain information or data sent by other device(s) or chip(s).

Optionally, the chip 1000 may further include an output interface 1040. The processor 1010 can control the output interface 1040 to communicate with other device(s) or chip(s), and specifically, can output information or data to other device(s) or chip(s).

Optionally, the chip may be applied to the network device in the embodiments of the present disclosure, and the chip can implement the corresponding process implemented by the terminal device in each method of the embodiments of the present disclosure. For the sake of brevity, details are not described herein again.

It should be understood that the chip mentioned in the embodiments of the present application may also be called a system-level chip, a system chip, a chip system, or a system-on-chip, etc.

It should be understood that the processor of the embodiments of the present application may be an integrated circuit chip with signal processing capability. In the implementation process, the steps of the foregoing method embodiments may be completed by hardware integrated logic circuits in the processor or instructions in the form of software. The aforementioned processor may be a general-purpose processor, a Digital Signal Processor (DSP), an Application Specific Integrated Circuit (ASIC), a Field Programmable Gate Array (FPGA) or other programming logic devices, discrete gates or transistor logic devices, discrete hardware components. The methods, steps, and logical block diagrams disclosed in the embodiments of the present application may be implemented or executed. The general-purpose processor may be a microprocessor or the processor may also be any conventional processor or the like. The steps of the method disclosed in the embodiments of the present application may be directly embodied as being executed and completed by a hardware decoding processor, or executed and completed by a combination of hardware and software modules in the decoding processor. The software module may be located in a mature storage medium in the art, such as a random access memory, a flash memory, a read-only memory, a programmable read-only memory, or an electrically erasable programmable memory, a register. The storage medium is located in the memory, and the processor reads the information in the memory and completes the steps of the above method in combination with its hardware.

It can be understood that the memory in the embodiments of the present application may be a volatile memory or a non-volatile memory, or may include both volatile memory and non-volatile memory. Among them, the non-volatile memory may be a Read-Only Memory (ROM), a Programmable ROM (PROM), an Erasable PROM (EPROM), and an Electrically EPROM (EEPROM) or a flash memory. The volatile memory may be a Random Access Memory (RAM), which is used as an external cache. By way of exemplary but not restrictive description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories of the systems and methods described herein are intended to include, but are not limited to, these and any other suitable types of memories.

It should be understood that the foregoing memories are exemplary but not restrictive. For example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM), etc. In other words, the memories in the embodiments of the present application are intended to include, but are not limited to, these and any other suitable types of memory.

Figure 9:
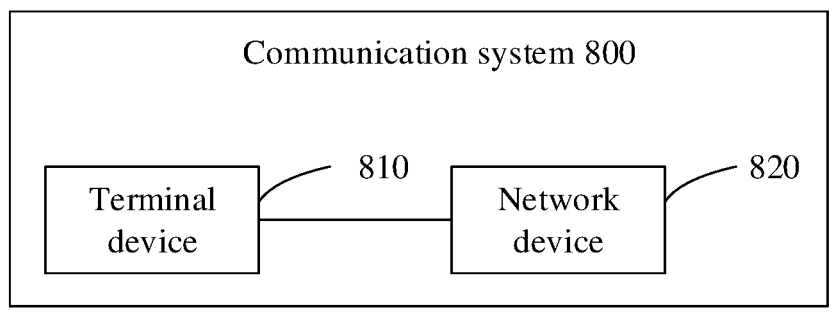
FIG. 9 is a second schematic diagram of a communication system architecture provided by an embodiment of the present application.

FIG. 9 is a schematic block diagram of a communication system 800 provided by an embodiment of the present application. As shown in FIG. 9, the communication system 800 includes a terminal device 810 and a network device 820.

The terminal device 810 may be used to implement the corresponding functions implemented by the UE in the foregoing method, and the network device 820 may be used to implement the corresponding functions implemented by the network device in the foregoing method. For brevity, details are not described herein again.

The embodiments of the present application also provide a computer-readable storage medium for storing computer programs.

Optionally, the computer-readable storage medium may be applied to the network device or the terminal device in the embodiments of the present application, and the computer program causes the computer to execute the corresponding process implemented by the network device in each method of the embodiments of the present application, which are not repeated here for the sake of brevity.

The embodiments of the present application also provide a computer program product, including computer program instructions.

Optionally, the computer program product may be applied to the network device or the terminal device in the embodiments of the present application, and the computer program instructions cause the computer to execute the corresponding process implemented by the network device in each method of the embodiments of the present application, which are not repeated here for the sake of brevity.

The embodiment of the present application also provides a computer program.

Optionally, the computer program may be applied to the network device or the terminal device in the embodiments of the present application. When the computer program runs on a computer, it causes the computer to execute the corresponding process implemented by the network device in each method of the embodiments of the present application, which are not repeated here for the sake of brevity.

A person of ordinary skill in the art may be aware that the units and algorithm steps of the examples described in combination with the embodiments disclosed herein may be implemented by electronic hardware or a combination of computer software and electronic hardware. Whether these functions are executed by hardware or software depends on the specific application and design constraint conditions of the technical solution. Professionals and technicians may use different methods for each specific application to implement the described functions, but such implementation should not be considered beyond the scope of the present application.

Those skilled in the art can clearly understand that, for the convenience and conciseness of description, the specific working process of the above-described system, apparatus, and unit may refer to the corresponding process in the foregoing method embodiments, which are not elaborated here.

In the several embodiments provided in the present application, it should be understood that the disclosed system, apparatus, and method may be implemented in other ways.

For example, the apparatus embodiments described above are only illustrative. For example, the division of the units is only a logical function division, and there may be other divisions in actual implementation, for example, a plurality of units or components may be combined or may be integrated into another system, or some features may be ignored or not implemented.

In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or they may be distributed on a plurality of network units. Some or all of the units may be selected according to actual needs to achieve the objectives of the solutions of the embodiments.

In addition, the functional units in the various embodiments of the present application may be integrated into one processing unit, or each unit may exist alone physically, or two or more units may be integrated into one unit.

If the function is implemented in the form of a software functional unit and sold or used as an independent product, it may be stored in a computer readable storage medium. Based on this understanding, the essence of the technical solution or the part that contributes to the related art or the part of the technical solution in the present application may be embodied in the form of a software product, and the computer software product is stored in a storage medium, which includes several instructions for enabling a computer device (which may be a personal computer, a server, or a network device, etc.) to execute all or part of the steps of the methods described in the various embodiments of the present application. The aforementioned storage media include: a U disk, a mobile hard disk, a Read-Only Memory (ROM), a Random Access Memory (RAM), a magnetic disk, an optical disk, or other media that can store program codes.

The above contents are only specific implementations of the present application, and the protection scope of the present application is not limited thereto. Any person skilled in the art can easily think of changes or substitutions within the technical scope disclosed in the present application, which should be covered within the scope of protection of the present application. Therefore, the protection scope of the present application should be subject to the protection scope of the claims.

What is claimed is:

1. A discontinuous reception processing method, the method comprising:
   receiving, by a terminal device, data on a first downlink (DL) bandwidth part (BWP); wherein the first DL BWP is a BWP configured with a monitoring occasion of a wake-up signal (WUS); and
   when the terminal device switches from the first DL BWP to a second DL BWP to receive data within the monitoring occasion of the WUS configured on the first DL BWP and before a discontinuous reception (DRX) ON duration timer starts, starting, by the terminal device, the DRX ON duration timer at a starting moment of the DRX ON duration timer to enter a DRX activation period;
   wherein the second DL BWP is a BWP that is not configured with a monitoring occasion of WUS.

2. The method according to claim 1, wherein the method further comprises:
   receiving, by the terminal device, radio resource control (RRC) configuration information sent by a network device;
   wherein the RRC configuration information carries: a DRX configuration parameter, a BWP configuration parameter, and a WUS configuration parameter.

3. The method according to claim 2, wherein
   the DRX configuration parameter comprises: a long DRX cycle and the DRX ON duration timer;
   the BWP configuration parameter comprises at least one of: at least one DL BWP and a BWP deactivation timer;
   the WUS configuration parameter comprises: a first type of DL BWP configured with the monitoring occasion of the wake-up signal (WUS), and a second type of DL BWP not configured with the monitoring occasion of the WUS; wherein the first type of DL BWP comprises the first DL BWP; the second type of DL BWP comprises the second DL BWP; and
   the first type of DL BWP and the second type of BWP are DL BWPs in the at least one DL BWP.

4. The method according to claim 3, wherein the method further comprises:
   when the BWP deactivation timer expires, switching, by the terminal device, from the first DL BWP to the second DL BWP to receive data.

5. The method according to claim 4, wherein
   the second DL BWP is: an initial DL BWP or a default DL BWP.

6. The method according to claim 3, wherein the method further comprises:
   when a random access occurs in the terminal device, switching, by the terminal device, from the first DL BWP to the second DL BWP to receive data.

7. The method according to claim 6, wherein
   the second DL BWP is: an initial DL BWP or a DL BWP with a same identification as a currently activated UL BWP.

8. A terminal device, comprising:
   a processor and a memory for storing a computer program,
   wherein the processor is configured to run the computer program stored in the memory to:
   receive data on a first downlink (DL) bandwidth part (BWP); wherein the first DL BWP is a BWP configured with a monitoring occasion of a wake-up signal (WUS); and
   when switching from the first DL BWP to a second DL BWP to receive data within the monitoring occasion of the WUS configured on the first DL BWP and before a discontinuous reception (DRX) ON duration timer starts, start the DRX ON duration timer at a starting moment of the DRX ON duration timer to enter a DRX activation period;
   wherein the second DL BWP is a BWP that is not configured with a monitoring occasion of WUS.

9. The terminal device according to claim 8, wherein the processor is further configured to receive radio resource control (RRC) configuration information sent by a network device;

wherein the RRC configuration information carries: a DRX configuration parameter, a BWP configuration parameter, and a WUS configuration parameter.

10. The terminal device according to claim 9, wherein the DRX configuration parameter comprises: a long DRX cycle and the DRX ON duration timer;

the BWP configuration parameter comprises at least one of: at least one DL BWP and a BWP deactivation timer;

the WUS configuration parameter comprises: a first type of DL BWP configured with the monitoring occasion of the wake-up signal (WUS), and a second type of DL BWP not configured with the monitoring occasion of the WUS; wherein the first type of DL BWP comprises the first type of DL BWP; the second type of DL BWP comprises the second DL BWP; and the first type of DL BWP and the second type of BWP are DL BWPs in the at least one DL BWP.

11. The terminal device according to claim 10, wherein the processor is further configured to, when the BWP deactivation timer expires, switch from the first DL BWP to the second DL BWP to receive data.

12. The terminal device according to claim 11, wherein the second DL BWP is: an initial DL BWP or a default DL BWP.

13. The terminal device according to claim 10, wherein the processor is further configured to, when a random access occurs, switch from the first DL BWP to the second DL BWP to receive data.

14. The terminal device according to claim 13, wherein the second DL BWP is: an initial DL BWP or a DL BWP with a same identification as a currently activated UL BWP.

* * * * *